(12) United States Patent
Redmann et al.

(10) Patent No.: US 9,049,345 B2
(45) Date of Patent: Jun. 2, 2015

(54) METHOD AND SYSTEM FOR MONITORING A DISPLAY VENUE

(75) Inventors: William Gibbens Redmann, Glendale, CA (US); Mark J. Huber, Burbank, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 13/138,044

(22) PCT Filed: Nov. 4, 2009

(86) PCT No.: PCT/US2009/005964
§ 371 (c)(1),
(2), (4) Date: Jun. 27, 2011

(87) PCT Pub. No.: WO2010/077258
PCT Pub. Date: Jul. 8, 2010

(65) Prior Publication Data
US 2011/0271295 A1    Nov. 3, 2011

Related U.S. Application Data

(60) Provisional application No. 61/203,804, filed on Dec. 29, 2008.

(51) Int. Cl.
| | |
|---|---|
| H04H 60/56 | (2008.01) |
| H04N 7/173 | (2011.01) |
| G06K 9/00 | (2006.01) |
| H04N 9/31 | (2006.01) |
| H04N 17/00 | (2006.01) |
| H04N 21/234 | (2011.01) |
| H04N 21/414 | (2011.01) |
| H04N 21/4223 | (2011.01) |
| H04N 21/658 | (2011.01) |

(52) U.S. Cl.
CPC ............ *H04N 7/173* (2013.01); *G06K 9/00496* (2013.01); *G09G 2320/0693* (2013.01); *H04N 9/31* (2013.01); *H04N 9/3194* (2013.01); *H04N 17/004* (2013.01); *H04N 21/23418* (2013.01); *H04N 21/41407* (2013.01); *H04N 21/41415* (2013.01); *H04N 21/4223* (2013.01); *H04N 21/6582* (2013.01)

(58) Field of Classification Search
CPC ..................................................... H04H 60/33
See application file for complete search history.

(56) References Cited

U.S. PATENT DOCUMENTS

| | | | | |
|---|---|---|---|---|
| 5,447,811 | A  * | 9/1995 | Buhr et al. | 430/20 |
| 6,356,939 | B1 * | 3/2002 | Dahl | 709/209 |
| 6,760,010 | B1 * | 7/2004 | Webb | 345/168 |
| 2004/0117815 | A1 | 6/2004 | Kondo et al. | |
| 2005/0060751 | A1 * | 3/2005 | Glaser | 725/87 |
| 2005/0188399 | A1 * | 8/2005 | Tischer | 725/34 |
| 2006/0055803 | A1 * | 3/2006 | Tognazzini | 348/333.01 |
| 2006/0094409 | A1 * | 5/2006 | Inselberg | 455/414.1 |

FOREIGN PATENT DOCUMENTS

| | | |
|---|---|---|
| FR | 2862475 | 5/2005 |
| JP | 2006-033357 | 2/2006 |

\* cited by examiner

*Primary Examiner* — Hunter B Lonsberry
(74) *Attorney, Agent, or Firm* — Robert D. Shedd; Robert B. Levy (57) ABSTRACT

A method and system for monitoring a display venue are disclosed. One method involves receiving information generated by an audience in response to a request associated with content provided to the audience at a display venue, and determining at least one condition at the display venue based on the information.

20 Claims, 6 Drawing Sheets

METHOD AND SYSTEM FOR MONITORING A DISPLAY VENUE

CROSS-REFERENCE TO RELATED APPLICATIONS

This application claims the benefit, under 35 U.S.C. §365 of International Application PCT/US2009/005964, filed Nov. 4, 2009, which was published in accordance with PCT Article 21(2) on Jul. 8, 2010 in English and which claims the benefit of United States provisional patent application No. 61,203,804, filed Dec. 29, 2008.

TECHNICAL FIELD

This invention relates to a method and system for monitoring or assessing conditions at a display venue based on one or more audience responses.

BACKGROUND

Modern exhibition theaters make use of many different systems for projection and presentation. It is not uncommon for an auditorium to sport an On-Screen Advertising (OSA) system, a film projector, and a digital cinema projection system, all making use of the same lighting, audio system, projection screen, theatrical masking, and curtains as originally configured for use with a film (i.e., non-digital) projector. The digital cinema projection system is adjusted to approximate the film configuration, while the OSA system may often use a different video projector.

The various equipment or systems are often owned and operated by different entities. For example, the film projector is generally owned, maintained, and operated by the exhibitor or theatre, while digital cinema systems are often owned and maintained by financing organizations, but operated by the theatre. OSA systems are most often owned, maintained and operated by third-party advertising companies. Due to the number of systems, their aggregate complexity, their interdependence, and the diversity of ownership, operation, and maintenance responsibilities, maintaining an auditorium's presentation system to target quality levels is often a challenging process.

Quality control is important for maintaining the audience's perception of quality in a presentation. In an OSA system, presentation quality may affect the perception of advertisers' products, and by extension, the advertisers' willingness to pay for advertising services. For the feature presentation, a low quality presentation may suggest to the audience that a better quality experience may await them with a high definition television (HDTV)—and may, over time, results in a reduced attendance. Certain presentations, especially those in 3-dimension (3D), are keenly interested in certain alignments of a theatrical projection system, e.g., storytelling becomes confusing and difficult if hints and clues to characters' actions and intents are obscured due to image cropping. Some special effects achievable in 3D would fail if the masking crops the image too closely.

Unfortunately, the primary method for monitoring theatrical presentation quality is to survey or audit actual operations, which requires a technician to visit each auditorium at a time when displaying a test pattern and taking measurements does not conflict with normal business operations and presentation schedules, e.g., when the theatre is closed (and therefore difficult for the technician to visit). As a result, present-day projection system audits are rarely carried out.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

BRIEF SUMMARY OF THE INVENTION

Embodiments of the present invention provide a method and system for use in monitoring or assessing conditions of a display venue.

One embodiment provides a method, which includes: receiving information from an audience, the information generated in response to a request associated with content provided to the audience at a display venue, and determining at least one condition at the display venue based on the received information.

Another embodiment provides a method, which includes: displaying content to an audience in a display venue; requesting at least one response from an audience, the at least one response to include an image of at least a portion of the displayed content, and obtaining information relating to at least one condition at a display venue based on the at least one response.

Another embodiment provides a system, which includes a processor configured for displaying content to an audience in a display venue for requesting at least one response from the audience, in which the at least one response includes an image of at least a portion of the displayed content, and a server configured for receiving the at least one response.

DETAILED DESCRIPTION

Embodiments of the present principles provide a method and system for assessing conditions in a display venue through real-time responses from audience. One method provides displayed content to an audience and requests the audience to provide a response. The audience's responses allow real-time information to be obtained regarding the quality and/or operating conditions of the equipment, or environmental conditions at the venue. Actions may be taken either in real-time or at a later time after a show, as appropriate, to remedy or improve the conditions. In one embodiment, the displayed content includes a test pattern with one or more elements for assessing the performance of the projection system, and a request for the audience to submit a response.

Figure 1:
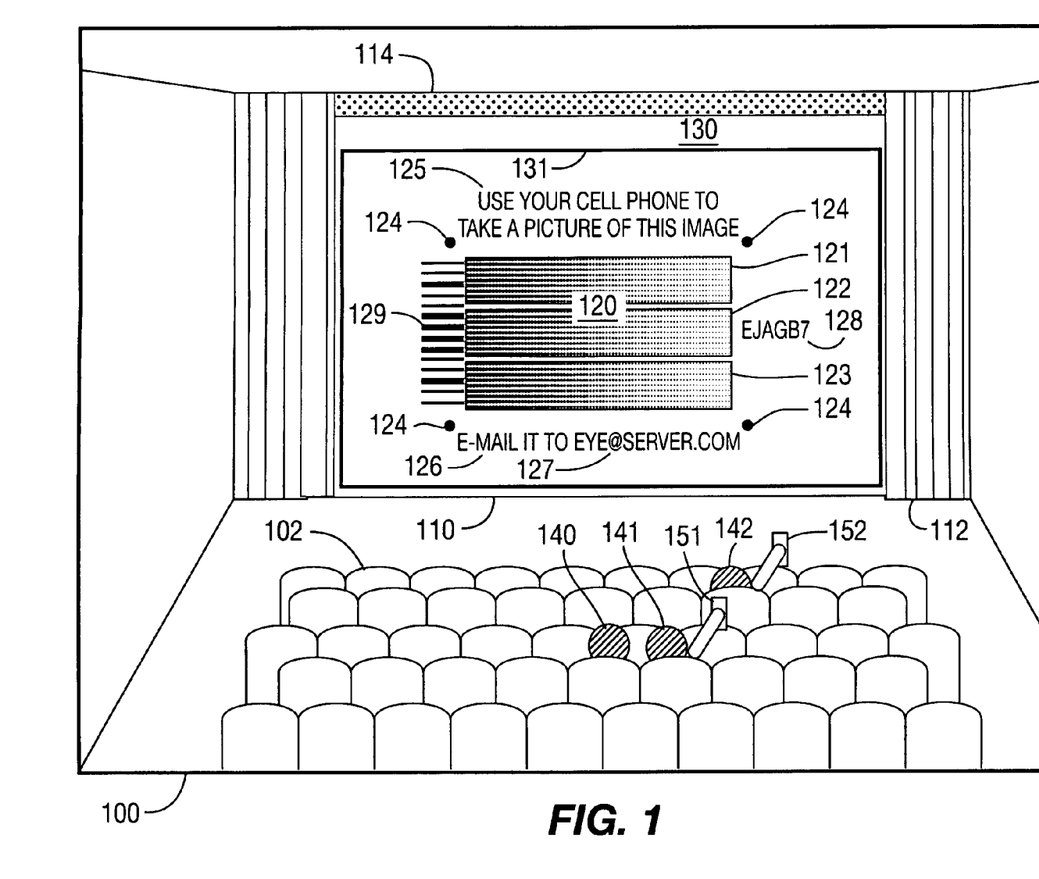
FIG. 1 illustrates content being displayed in a display venue according to one embodiment.

FIG. 1 illustrates one embodiment of a test pattern shown to an audience in a display venue, e.g., auditorium, lecture hall, theater, and so on. Display venue or auditorium 100 includes a seating area 102 and a projection screen 110. Screen 110 is bordered by side masking 112, curtains (not shown) and top masking 114. Some auditoriums also use bottom masking (not shown).

A test pattern 120, which is designed for use in assessing conditions of the display venue, may include one or more of the following elements: border 131, alignment marks 124, outer region 130, red gradient 121, green gradient 122, blue gradient 123, identifying text 128, and identifying barcode 129. An invitation 125, submission instruction 126, and address 127 are also shown on screen 110. Other test pattern elements or features (not shown) may also be included, e.g., an offer of a reward or contest entry.

The identification of the auditorium may be provided by an identifier or indicia (not shown) positioned adjacent or in close proximity to the screen 110. Alternatively, the address 127 may serve as the identifier, e.g., if it corresponds to the location of the auditorium.

Among audience members 140, 141 and 142, members 141 and 142 are shown responding to invitation 125 by taking photographs of the screen 110 with their respective portable devices 151, 152 with image-capturing capabilities, e.g., cell phones with cameras, personal digital assistants, among others. Any response from an audience member in accordance with the displayed invitation 125 and submission instruction 126 is sufficient to demonstrate that the projection system is operational (e.g., the projection lamp is not burned out, content is being received and is being played out), and the presence of audience.

One or more elements in the test pattern 120 are used to provide additional details relating to the status of the projection system 222. For example, border 131 may be used to designate an expected "safe area" in the content provided to the projection system 222. This safe area may correspond to regions in the content with advertising text, phone numbers, titles, subtitles, captions, and the like, which are inappropriate to have cropped by masking 112, 114, or by any edge of the screen 110.

If audience members 141-142 submit an image or photograph of test pattern 120 showing border 131 being clipped, then the status of the projection system 222 is known to violate the safe area. Similarly, additional borders or boundaries (not shown) can be provided if there are multiple safe areas of interest, e.g., well known in the motion picture and television industry are the "title safe" and "action safe" areas, which are concentric. Additional borders may also be used, for example, for content having different aspect ratios, or for special purposes, such as to check the masking position with respect to a 3-dimensional (3D) presentation.

Outer region 130 of test pattern 120 is preferably a non-black region (e.g., white, colored, or patterned) extending to the edge of the content frame (i.e., out to the edge pixels of content provided for the projection system 222, whether or not they are actually displayed on screen 110). A photograph submitted of test pattern 120 may show whether the projected image of the test pattern 120 is too small, in which case, a gap will exist between an outer edge of the outer region 130 and the respective masking or edge of screen 110. Such a gap might indicate that the projection system under test is not adequately configured to fill the screen, and may need to be adjusted.

Additionally, the photograph can be examined for any variation in width of the outer region 130, or the distance between border 131 and the edge of the screen (as limited by the edge of the screen 110, side masking 112, top masking 114, or curtains) to determine the presence and degree of keystoning (i.e., if one edge of the border 131 undergoes a higher magnification in projection than the opposite edge).

In an auditorium 100 having a well configured projection system 222, the width of the outer region 130 should be uniform, and of a predetermined desirable size (i.e., fraction of the test pattern width or height). Non-uniformity in the width of the outer region 130 or an excessive distance between border 131 and any edge of the projectable portion of the screen may result in the auditorium 100 being tagged or identified as having a projection system 222 in need of adjustment.

To calibrate for such an analysis, alignment marks 124 may be provided, e.g., marks 124 having a predetermined configuration within test pattern 120. By de-keystoning or de-warping a photograph from the audience using alignment marks 124, distortions in the submitted picture induced by both the projection system 222 and the point-of-view of the audience member submitting the photograph can be removed. Additional details or algorithms relating to de-keystoning or de-warping can be found, for example, in "Digital Image Warping" by George Wolberg, IEEE Computer Society Press Monograph, published by Wiley (1990). The resulting de-keystoned or de-warped image will be substantially congruent to the original test pattern 120 supplied to the auditorium.

Additionally, alignment marks 124 may be presented in test pattern 120 in an unambiguous or unique arrangement, such that characteristics of the projected content can be unambiguously determined from the captured image, regardless of the orientation (e.g., portrait or landscape) of the audience's camera. In still another embodiment, one or more of alignment marks 124 may be distinguishable from the other alignment marks 124, e.g., by different colors, shapes and/or patterns. For example, the top-left alignment marks 124 may be red, but the other three alignment marks 124 may be black.

Primary color gradients 121-123 may be provided to determine that each of the red, green, and blue color components of the projection system 222 are working correctly and has an appropriate gamma setting. Each of gradients 121-123 may be accompanied by an adjacent, parallel 50/50 checkerboard pattern (not shown) in the corresponding color, which can help distinguish whether or not the gamma setting of the projection system 222 is set correctly. Other color gradients, e.g., non-primary colors, or a neutral color such as grey, may also be used.

Other test pattern elements (not shown) may include one or more focus patterns, resolution charts or color patches with diagnostic values that are independent of the optical or other processing qualities of the audience's cameras.

Test pattern 120 can also be made visually more interesting to the audience by animating or concealing (as in camouflaging or otherwise covertly presenting) the test pattern elements. For example, gradients 121-123 may be animated as snakes traveling around the screen. Border 131 may be the edge of a building facade, window, or picture frame (or any appropriate rectangular object), or other shapes that may be suitable for a particular screen (e.g., round for an Omnimax screen, or other shapes for special venues). Alignment marks 124 may be substituted by objects or features within an image element (not shown) of test pattern 120 that are relatively easy to discern and locate, e.g., a lone flower, the top of a telephone pole, an electrical wall socket, a mountain peak, the dot of an "i" in a line of text, and so on.

In an alternative embodiment, the function of alignment marks 124, border 131, and outer region 130 may be effectively provided by presenting in all or part of test pattern 120 an auto-correlatable image (not shown). Such an auto-correlatable image usually has certain regions that correlate well with themselves (e.g., having distinctive scenes or shapes that allow for easily identifications), but less well with neighboring regions. In this embodiment, a specific location in the auto-correlatable image would correspond to the position of each of alignment marks 124, though the marks 124 themselves would not be included in the image. A locus of points in the auto-correlatable image would lie along an otherwise invisible border 131. Such a virtual alignment mark 124 or virtual border 131 could be reconstructed by de-keystoning or de-warping a submitted photograph to overlay substantially with the original test pattern 120 having the auto-correlatable image (not shown).

That is, the submitted photograph is subjected to an operation that effectively compensates for any distortions (e.g., keystoning), such that certain selected features in the submitted photograph substantially overlap with corresponding features in the original pattern. This can be achieved by using an auto-correlation algorithm, which determines a best fit between a particular region of the submitted image and a location of the original pattern e.g., by performing a pixel-for-pixel least-sum-of-the-squares-of-the-differences (LSQD) between each pixel of the region of interest with a like-shaped patch that rasters over the original image. In this way, each possible like-shaped patch in the entirety of the original image or pattern is compared to the selected region of the submitted image, and the best match is found. Once the correct locations of the selected features are established, the submitted image can be de-warped by using the correlated regions as control points, which are moved to the best-match locations within the original image. In some situations, this process may be iterative.

Thus, instead of actual alignment marks 124 or border 131, the test pattern 120 can also use an auto-correlatable image to provide similar benefits as if the alignment marks and/or border were present, since virtual versions of the marks and borders can be associated with regions of the source or original image.

In this way, the information provided by many of the suggested elements for test pattern 120 can be obtained through one or more images that do not otherwise appear to be test patterns, and may even be pleasing or entertaining to the audience.

If audiences from more than one auditoriums are requested to submit responses within overlapping time intervals, it will be necessary to distinguish between pictures of test pattern 120 captured in different auditoriums so that the status revealed by the submitted pictures can be correctly attributed to the appropriate auditorium. This may be achieved by including an auditorium identifier in the presentation of test pattern 120, such as an identifying text 128 or barcode 129, which preferably identifies auditorium 100 uniquely.

A test pattern 120 having the identifying text 128 and/or barcode 129 as integral elements may be designated for use only in one auditorium. Alternatively, the test pattern 120 may be designated for use in different auditoriums in different time windows, e.g., a particular identifying text 128 or barcode 129 is used in auditorium 100 this week, but may be used next month in a different auditorium.

In another embodiment, identifying text 128 and/or barcode 129 can be presented as dynamically generated subtitles, such as those described in a PCT patent application PCT/US08/008166, "Method and Apparatus for Dynamic Displays for Digital Cinema" by Redmann and Perkins (Attorney Docket: PU080106, filed Jun. 30, 2008), which generates dynamic or customized information for display by processing a subtitle file that includes at least one element related to the dynamic information. For example, identifying text 128 or barcode 120 may be a dynamically rendered subtitle representative of a serial number, e.g., of a component of the projection system of auditorium 100.

In other embodiments, identifying text 128 or barcode 129 may not be present in the test pattern 120 as distributed to the exhibitor. Instead, the auditorium identifier may be embedded in the address 127 displayed to the audience. For example, address 127 may be provided either as an integral element or a dynamically generated subtitle, e.g., 010234@server.com, where "010234" is a serial number associated with auditorium 100 (e.g., the projection system has a component with serial number 010234) or 10.255.5.124@server.com, where the address is derived from a network address corresponding to the projection system of auditorium 100. Instead of being displayed, an address 127 that includes an auditorium identifier may be announced in the audio portion of the presentation.

In still other embodiments, the identifier may not be displayed by projection system of auditorium 100 at all. Instead, visible indicia such as barcode 129 or text 128 may be present as a sign (not shown) at the edge of screen 110, such that it is included in the photograph or image submitted by the audience. Alternatively, submission instructions 126 may direct audience members to submit their photographs to the address printed on their ticket stub, or displayed at the back of the theatre (e.g., using a static sign, or an open- or closed-caption device). One advantage of having instructions printed on ticket stubs is that the same content is usable everywhere, and no special equipment or preparation (other than for printing the ticket stubs) is needed.

The presentation of the three elements (invitation 125, test pattern 120, and submission instructions 126) forming a test sequence may be included in a longer presentation. These elements may be shown as a time sequence, e.g., with one or more elements appearing at different times, or all elements appearing at the same time. In other embodiments, the time sequence may include a request for audience response, which serves as a combined invitation and submission instruction. Preferably, the test sequence is shown in the course of a normal show presentation, such as an OSA presentation or during the theatrical trailers, but not during the main feature.

The test sequence is preferably packaged as content apropos to the system to be tested. Thus, to test an OSA projection configuration, the test sequence would be packaged as OSA content, for example as an MPEG2 file, or other format suitable for the OSA system. To test a digital cinema system, the test sequence would be packaged as a digital cinema package (DCP) including a composition playlist (CPL) and corresponding picture and audio track files. In some embodiments, subtitle track files may also be included. Furthermore, depending on the embodiment, a key-delivery message (KDM) corresponding to both the CPL and the specific digital cinema projection system may also be needed, if the CPL is encrypted. To test film projection systems, the test sequence would be provided to the auditorium as film, with soundtrack if desired, to be spliced into the rest of the film being shown.

For example, a piece of content containing the test sequence can present invitation 125 prior to showing test pattern 120, and then after showing test pattern 120 for an amount of time sufficient for photographs to have been taken, the content can present submission instructions 126. Test pattern 120 may be animated so as to provide a more intriguing display for the audience. Following the presentation of submission instruction 126, the presentation content may advise the audience to turn off their cell phones or other mobile communication devices.

Figure 2:
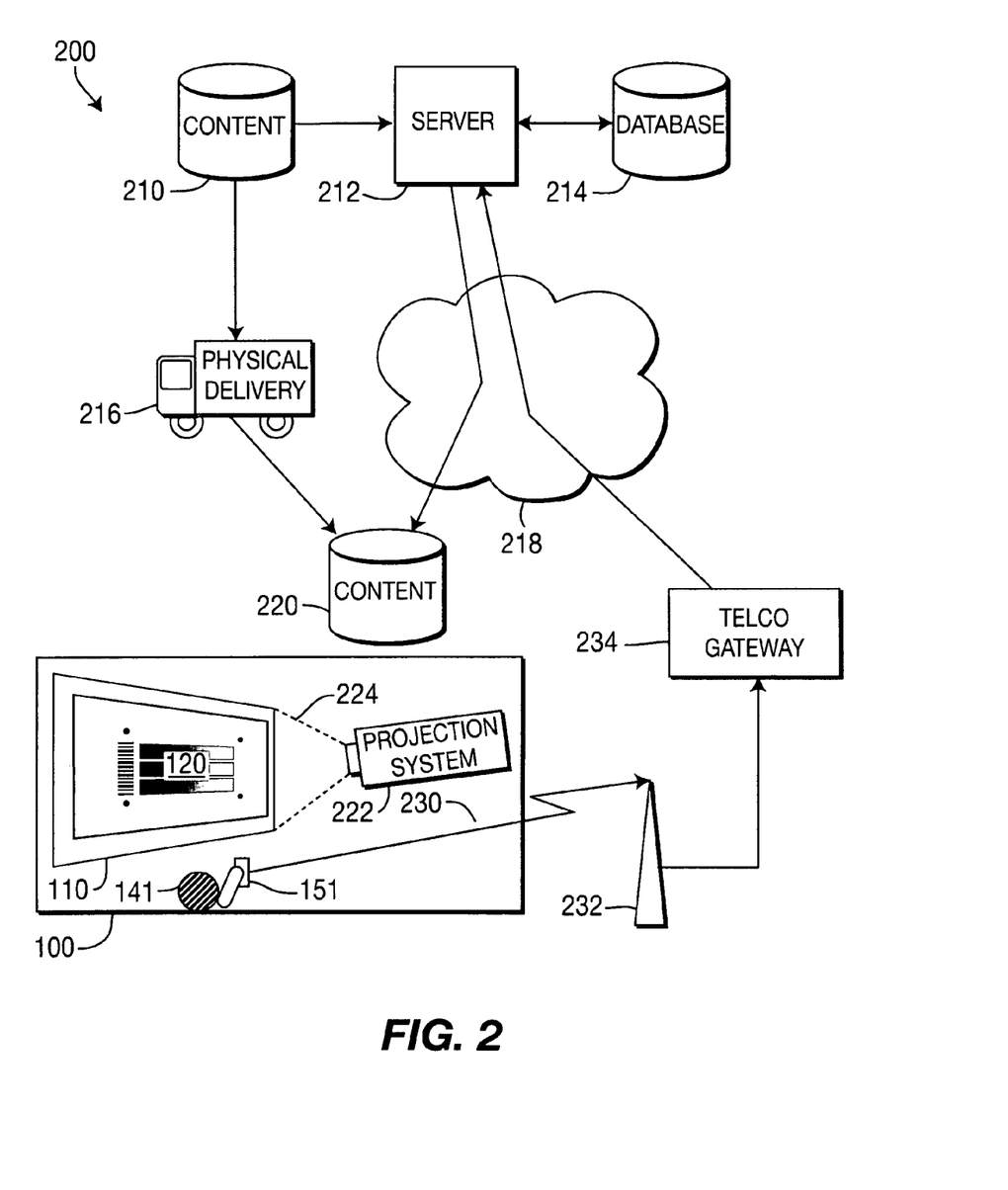
FIG. 2 illustrates a system for delivering content to and collecting responses from an auditorium according to one embodiment.

FIG. 2 shows projection system quality audit system 200. Content 210 includes the test sequence of invitation 125, test pattern 120, and submission instructions 126.

Physical delivery 216, e.g., mail, parcel or freight delivery, courier, or pickup by the exhibitor, is used to transport content 210 (e.g., film or digital content on removable media such as tape or hard disk) to the exhibitor as delivered content 220. Digital content may also be delivered via electronic means, e.g., transmitted by server 212 over a network, such as interne 218, cable or satellite (not shown) to a server associated with the exhibitor (e.g., at the exhibitor's site or accessible to the exhibitor). In general, the distribution method for the content including the test sequence is the same as those for other content (not shown) to be used with the projection system.

Server 212 preferably has access to a database 214, which tracks the association between identifiers (e.g., may be represented by text 127 and/or barcode 128) and a corresponding auditorium. If an identifier is embedded in content 210, as when unique content is prepared for the auditorium 100, the association of the identifier and the corresponding auditorium 100 is recorded in database 214, e.g., by server 212. The association in database 214 between content 210 with an embedded identifier and auditorium 100 can be used by server 212 to generate a shipping order for physical delivery system 216, or to address the electronic delivery of the content. If this association is time-varying (i.e., a particular piece of content with embedded identifiers is schedule to move among various auditoriums over time), this is also recorded in database 214.

Once received content 220 is provided to projection system 222, a show that includes the test sequence of content 220 is prepared and run, as discussed above, and the test pattern 120 is displayed on screen 110. In response to invitation 125, audience member 141 takes a picture of displayed test pattern 120. In response to submission instructions 126, audience member 141 submits the picture to the address 127, for example, by attaching the picture in an email. Preferably, audience member 141 submits the picture contemporaneously with the presentation of the test sequence, since this minimizes the chance that the picture or the submission instructions 126 will be forgotten. If a cell phone is used, the picture can be submitted over wireless link 230 to cellular telephone service tower 232, through the cellular service provider's network (not shown) and a gateway 234 to the internet 218 (or other connection) to server 212 where the submission is stored, for example in database 214, for subsequent analysis.

Figure 3:
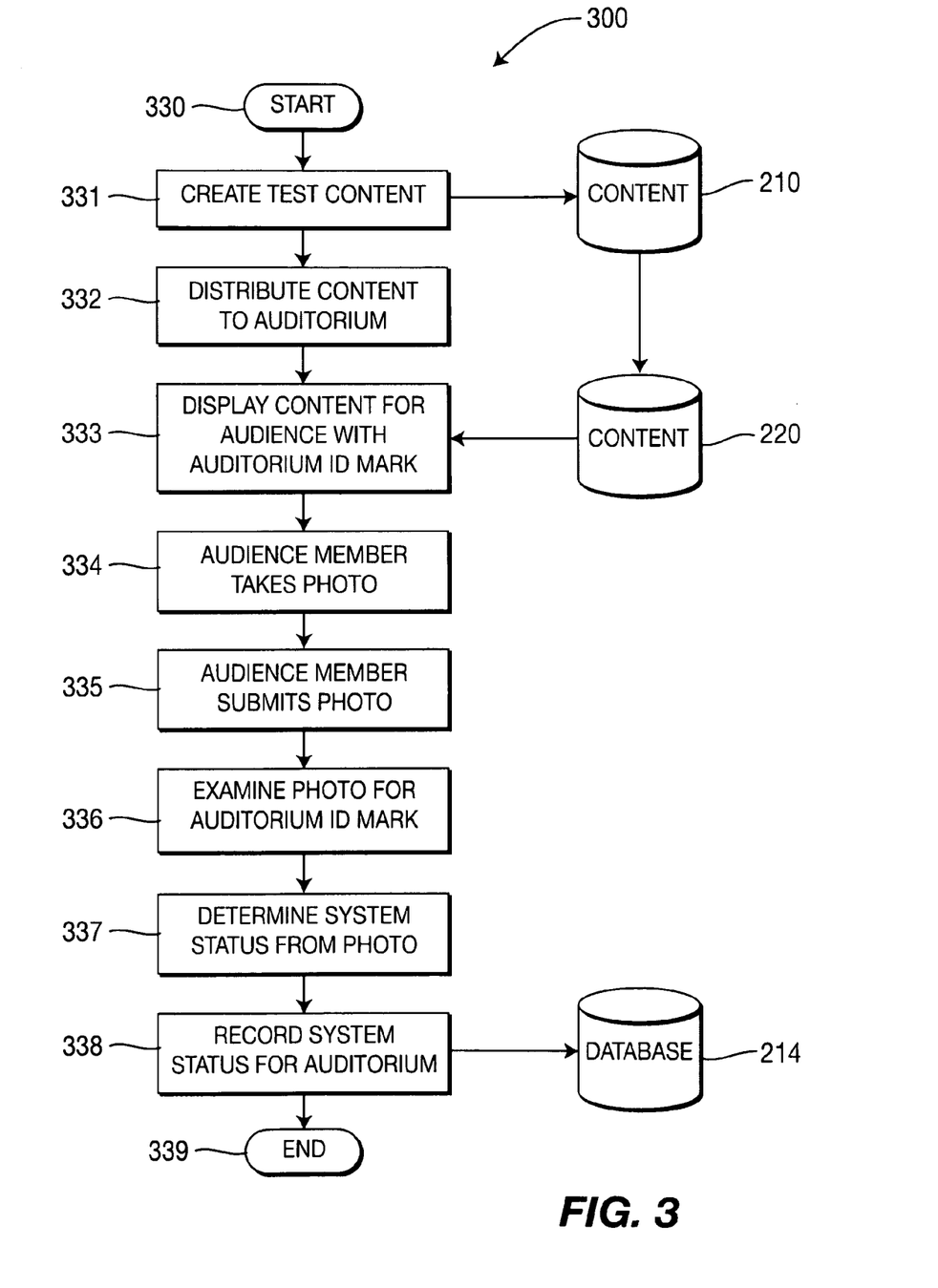
FIG. 3 illustrates a method for delivering content to and collecting responses from an auditorium according to one embodiment.

FIG. 3 shows a flowchart of a process 300 having a test sequence in which an identifier is provided in an auditorium, instead of being included in the content, as delivered to an exhibitor. In start step 330, the process is initialized, for example by receiving a work order for a test sequence to be provided for a particular auditorium.

Content creation step 331 prepares content appropriate for one or more auditoriums, which includes a test sequence. Depending on the nature of the projection system, the test sequence may be produced on printed films or as digital files.

In content distribution step 332, the content is delivered to an auditorium, e.g., auditorium 100. In the case of film, or digital files on removable media (e.g., hard drives, flash drives, DVD-ROMs, or tape), physical delivery methods are used. Digital content may also be delivered by by electronic means, e.g., via the internet, wide-area network (WAN), satellite, among others.

In presentation step 333, the test sequence, including the test pattern, is displayed to the audience. The delivered content may be presented as a part of a show. Preferably, an auditorium identifier (abbreviated as "ID" in FIG. 3), e.g., text 128, barcode 129, or an auditorium-specific portion of address 127, is dynamically generated by the projection system in response to interpreting instructions contained within delivered content, e.g., as discussed above in conjunction with the PCT application PCT/US08/008166, and displayed (whether in the picture content or subtitle or caption displays) with the test pattern from delivered content.

To display barcode 129 using dynamically-generated content, a barcode font would need to be included in the subtitle track file for rendering the dynamic subtitles as barcode 129. In still another embodiment, projection system can include a speech synthesis module that is used to dynamically generate audio to enunciate the auditorium-specific address 127, rather than display it on the screen.

In another embodiment, the identifying mark can be posted, e.g., adjacent to the screen, so that the mark is captured in photographs taken of the screen, or an auditorium-specific address may be printed on the ticket stubs retained by audience members.

In capture step 334, one or more photographs of the displayed test pattern are taken by the audience.

In submission step 335, responsive to submission instructions, at least one audience member submits the photograph to the specified address, e.g., using email or other message delivery service, and the photograph is made available to a recipient at the specified address. The photograph and/or the resulting analysis thereof (discussed below in a later step) is stored in a database, e.g., database 214, or a suitable memory device.

If the specified address is auditorium-specific, the server can associate the photograph with the specific auditorium according to the association present in the database. If the address is not auditorium-specific, then examination step 336 is needed to determine whether an identifying mark (e.g., text 128 or barcode 129) is contained in the received photograph. Each received photograph is examined and if such an identifying mark is detected and readable, then a record in the database is retrieved based on the identifying mark in the photograph and the association with the auditorium is made.

In a scenario where the examination step 336 finds an identifying mark not already known to the database (i.e., for a projection system of which it was previously unaware), then a record for the auditorium is created. However, additional research may be required if, for instance, the name and address of the theatre complex in which the auditorium resides is needed.

Examination step 336 may be carried out by a human operator, e.g., by viewing the received photograph on a terminal (not shown) connected to a server such as server 212. If an identifying mark is readable in the photograph, the operator can key the identifying text into the terminal to make the association.

In another embodiment, the examination step 336 is performed by an image recognition software process running on the server that is able to recognize an identifying mark (e.g., a barcode) within the photograph. If the identifying mark is text, then the image recognition software would include an optical character recognition (OCR) module. If other unique marking methods are used, for example, if the test pattern includes a unique image element (not shown), then the image recognition software would include a correlation process to determine which of a library of images used to mark test patterns is present in the photograph. Once a particular image is determined to be present, the association with the auditorium can be obtained from the database. These or other automatic image recognition software techniques are preferred, because reading barcodes from images, OCR software, and image correlation have advantages of being faster, more consistent, and relatively inexpensive, compared to a human operator.

However, some photographs submitted may suffer from distortions or other image quality issues, which result in the identifying mark being unreadable to automatic image recognition software. In such a case, photographs are preferably queued separately for examination by a human operator. In this way, the speed and relative economy of automatic processing is utilized where possible, but when desired, a human operator can examine the more challenging photographs in a second pass.

If an association is successfully made between a photograph and the auditorium in either submission step 335 (from auditorium-specific address) or in examination step 336 (from identifying marks), an analysis of the photograph is made in status determination step 337. In step 337, it is possible to only examine a single photograph associated with a particular auditorium to determine the current (or recent) status.

If a plurality of photographs is currently associated with the auditorium, one or more photographs may be presented to an operator for examining the photographs to determine the status of the corresponding projection system.

For example, as previously discussed in conjunction with FIG. 1, if border 131 is shown in the photograph to be intersecting masking 112, then the status of the projection system can be determined as being misaligned (i.e., off center) or oversized (i.e., too much magnification) or having incorrectly set masking.

If the photograph shows that outer region 130 is as not filling the clear portion of screen 110 along all edges, then the status of projection system can be determined as being underscanned (i.e., too little magnification).

If both of these conditions are present, it may be the case that the aspect ratio of the projection system does not agree with the aspect ratio to which screen and the associated masking 112 and 114 is set.

The status of other aspects of the projection system can be determined from other elements of the test pattern as they appear (or are absent from) the photograph. For example, if green gradient 122 of the test pattern does not appear in the photograph, then it can be determined that the green gun or green imager or the green signal path of the projection system is faulty.

In status recording step 338, the status detected in step 337 is stored in the database as being associated with the projection system of the identified auditorium.

In final step 339, the status determined for the projection system can be reported, or used to initiate an appropriate corrective maintenance action. Further, if the content is known to have been distributed to the identified auditorium, and yet the status for the corresponding projection system has not been updated by receipt of a photograph in step 335 within a given time after the scheduled show time of the content (e.g., a short time, which may be minutes, hours, or days, as determined by policies), then the status of the projection system and the auditorium can be set to include "non-reporting," which may be used as an indicator of the system's ability to schedule and show distributed content. The status of "non-reporting" is more significant than simply not having any data, because once the content has been distributed, the process of displaying the content may be considered automatic (i.e., the chance of the content not being displayed by an exhibitor is very low). If the system is working and the content is actually being displayed, the probability of having no audience member responding to the request for a photograph after, say, a week of performances, is vanishingly low. Thus, the status of "non-reporting" is strongly suggestive of a breakdown of the system, such that distributed content is not being displayed.

Figure 4:
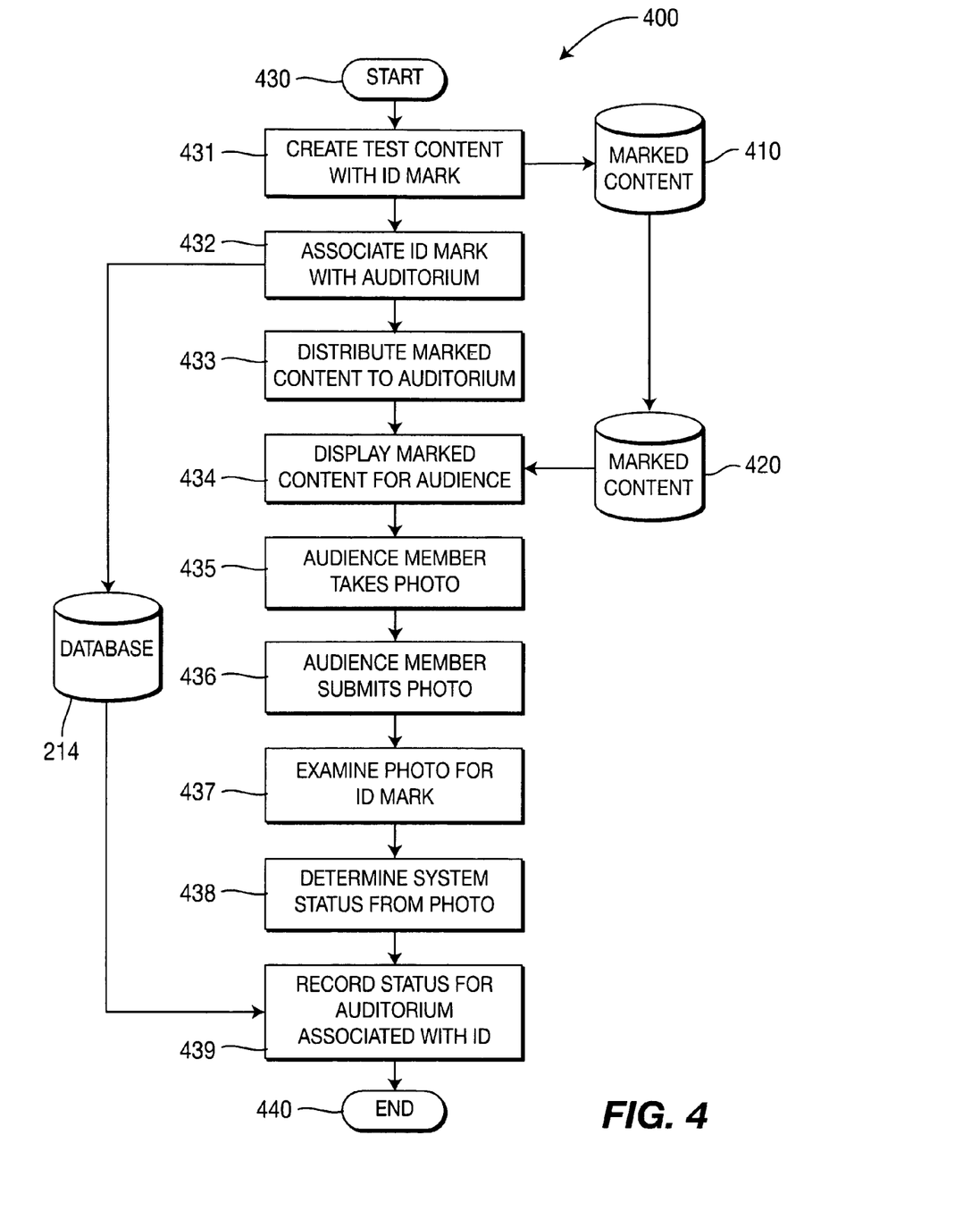
FIG. 4 illustrates a method for delivering content to and collecting responses from an auditorium according to another embodiment.

FIG. 4 is a flowchart of another embodiment, test process 400, using a test sequence having an identifier embedded in the content. In start step 430, the process is initialized, for example, by receiving a work order for a test sequence to be provided for a particular auditorium, e.g., auditorium 100.

Content creation step 431 preferably creates an identifier to be associated with the auditorium and creates marked content 410 (i.e., with identifier or ID mark) that includes the test sequence with the identifier. In association step 432, the association of the identifier with the auditorium is stored in a database, e.g., database 214. Alternatively, the identifier may be pre-existing and previously associated in the database with the auditorium, in which case, in step 431 the appropriate identifier is recalled, instead of created. Depending on the nature of the projection system in the auditorium, the test sequence may be provided on film or in digital file format.

In content distribution step 433, marked content 420 is delivered to the auditorium via physical or electronic means. The marked content 410 should be delivered to the specific auditorium for which it was prepared (unlike content distribution step 332), unless an alternative embodiment having one or more fix-up steps (not shown) can provide a reconciliation between the delivered marked content 420 and the auditorium to which it was actually delivered (e.g., marked content 410 might be tagged with a marking that the recipient exhibitor in the auditorium would report for recordation in database 214 upon delivery). In still another embodiment, an exhibitor might take an initial photograph of a test pattern during a test run, and submit it along with an annotation comprising information regarding the identity of the auditorium.

In presentation step 434, the test sequence, including the test pattern, is displayed to the audience, e.g., by including marked content 420 as part of a show. The identifying mark (e.g., text 128, barcode 129, or auditorium specific address 127) is displayed in the picture content, subtitle and/or caption displays. Alternatively, the auditorium-specific address may be announced in the corresponding audio program.

Capture step 435, submission step 436, examination step 437, and status determination step 438, are similar to the corresponding steps 334, 335, 336, and 337, respectively, of test process 300.

In examination step 437, it is not expected that any unknown identifying mark would be encountered, since all marked content 410 has been generated with an identifier or mark. Preferably, marked content 410 is destined for a known, predetermined, corresponding auditorium, but in an embodiment where this is not the case, other reconciliation steps (as previously discussed, but not shown) would be necessary (e.g., if marked content 410 were shipped to random participating auditoriums and the association between the identifying information in marked content 410 and the auditorium were to be determined after delivered marked content 420 is received).

In status recording step 439, the status determined in step 428 is stored in a database, e.g., database 214, as being associated with the projection system of the identified auditorium.

In final step 440, the status determined for projection system can be reported, or used to initiate one or more appropriate corrective maintenance actions. Further, if content is known to have been distributed to the identified auditorium, yet the status for the projection system has not been updated by receipt of a photograph in step 436 within a time after the scheduled show time of marked content 410 (whether as a matter of policy this time in minutes, hours, or days), then the status of the projection system and associated auditorium can be set to include non-reporting, which can be used as an indicator of the system's ability to schedule and show distributed content.

Figure 5:
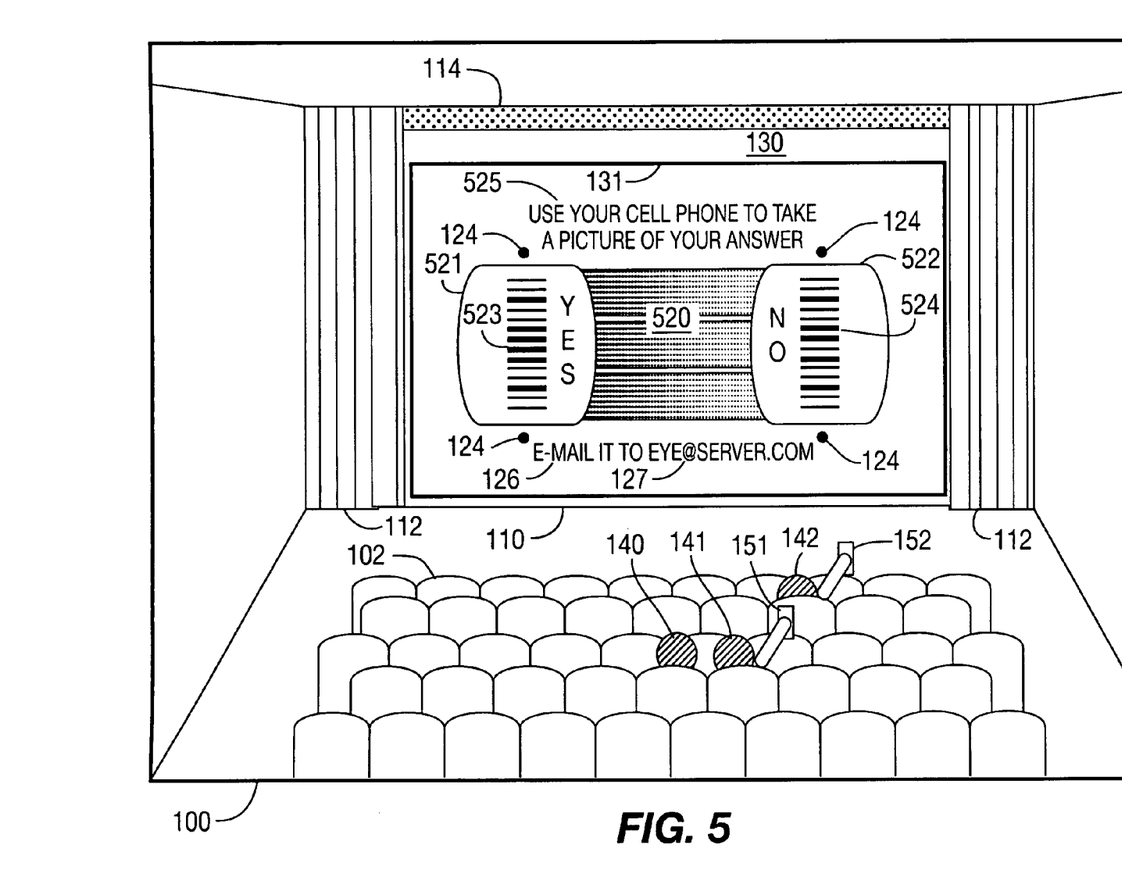
FIG. 5 illustrates content being displayed in a display venue according to another embodiment.

FIG. 5 shows an image or test pattern 520 that enables polling of audience members for conditions in auditorium 100 that cannot be determined from a photograph of test pattern 120. Examples of such conditions may include: whether the audio system is working, whether the environmental conditions, e.g., sanitary condition or temperature, of the auditorium is acceptable. Another example may relate to specific equipment directed to individual audience members, e.g., special effects built into a seat. Different options may be used to associate a response with a specific seat in order to assess its operating condition, e.g., by the audience member entering a seat number or by analyzing a photograph of the screen to determine the seat location of the audience member. The first option can easily be implemented by providing an appropriate annotation in the message displayed to the audience, e.g., by displaying a message: "Did you feel that?" and a corresponding instruction to text "Yes/No" and seat number to the server.

To determine the status of auditorium 100 with respect to such conditions, invitation 525 asks the audience to take a picture of their answers on test pattern 520 (e.g., "YES" answer 521 for an affirmative response, or "NO" answer 522 for a negative response), to a query posed by test pattern 520 (in FIG. 5, the inquiry is provided on the audio portion of the test sequence, e.g., "Is this audio too loud?"). The query can also be displayed as text in test pattern 520, and the audience can respond by taking a picture centered on "YES" answer 521, or "NO" answer 522.

After the pictures are submitted by the audience, they are examined for query response marks 523 and 524, each of which preferably encodes an identifier associated with each of the query (what question was asked), the specific auditorium, and the answer. For example, the receipt of a query response mark 523 (i.e., an affirmative response) in a photograph will indicate that the audio in auditorium 100 is considered to be too loud by an audience member.

If the audience member 141 has a camera with a field-of-view that is so wide that the picture includes both answers 521 and 522, then the examination will consider the more centrally positioned of the two responses as the answer from audience member 141.

For queries pertaining to individual preferences, a mix of "YES" and "NO" responses would be expected. In such a case, all photographs responsive to an invitation 525 would be considered. Further, the reporting in final steps 339 or 440 may indicate a total number of respondents and the ratio of the answers 523 and 524 returned, e.g., for auditorium 100, "25 respondents, 80% audio is too loud".

In an alternative embodiment, invitation 525 might request the audience to use other communication channels, e.g., short messaging service (SMS), to respond to queries. Thus, test pattern 520 may pose the query as "Text the message '010234' to the SMS short code '12300' if the audio is too loud, or to '12301' if the audio is fine." In this embodiment, short code '12300' takes the place of barcode 523 as indicating a "YES" answer, while short code "12301" takes the place of barcode 524 as indicating a "NO" answer. In such a query, the message 010234 is a serial number or other identifier associated with the auditorium or its projection system, either inherently, or by an association in database 214. The SMS short code '12300' would be associated by contract with one or more cellular service providers to forward the SMS message (entered by audience members as "010234") to an address on a server that would register a "YES" response to the query against the auditorium 100 associated with the identifier "010234" returned in the message.

Over just a few days, even if only two SMS short codes are used, content that includes a variety of tests can be run in auditorium 100, for example a different test pattern 520 every day for two weeks. At the end of two weeks, hundreds of audience members would have responded to each of the test patterns and built up a status for auditorium 100 (and indeed, with the same two short codes, at the same time, thousands of other auditoriums, too) representing many operational elements of projection system and auditorium 100.

Though less desirable because of their length, SMS long codes can also be used, but they are typically ten digits long. However, long codes do not require any special contracts with cellular service providers as do short codes.

In yet another alternative embodiment, a test sequence shown in auditorium 100 can direct audience members to a web site that presents them with one or more queries regarding auditorium 100. Such a test sequence must present an invitation to go to an address 127 that is a web site, rather than an email address or SMS long- or short code. The address 127 may be specific to auditorium 100, for example "http://www.server.com/010234.htm". The technical requirements for accumulating responses by SMS or using a web page are known in the art.

Figure 6:
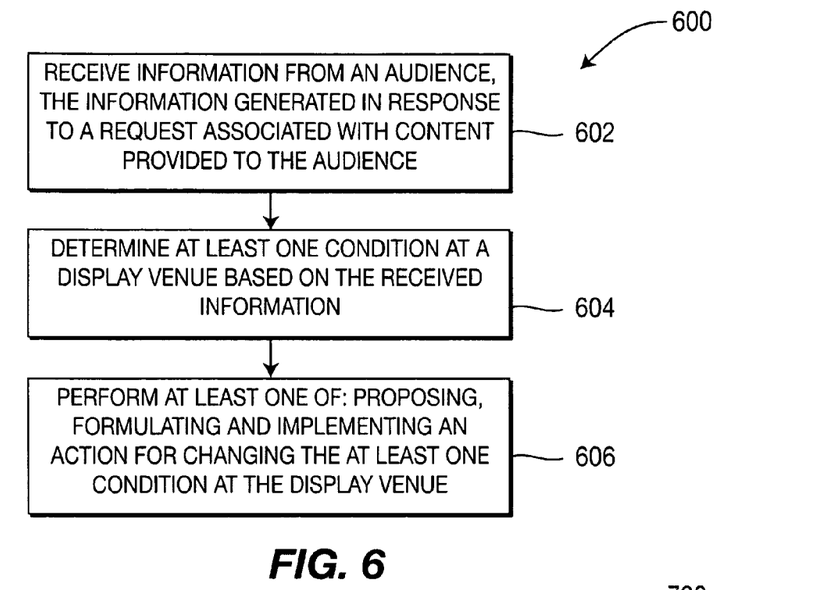
FIG. 6 illustrates a method for use in a display venue according to another embodiment.

While the above discussions are directed to more specific examples of test patterns for soliciting audience responses, FIG. 6 illustrates a method 600 for accessing or determining one or more conditions at a display venue, e.g., a theater, auditorium, lecture hall, among others. Examples of the display venue conditions may include operating conditions or performance status of an equipment or system (e.g., a projection system, audio equipment, and so on) or environmental conditions at the venue. In step 602, audience-generated information is received, with the information being generated in response to a request associated with content provided to the audience. For example, the request for response may be included visually as a part of the displayed content, or as an audio portion of the provided content. The displayed content is suitable for use in determining at least one condition at the display venue, and may include a test pattern or image. In another embodiment, the request for response might be presented separately, that is, asynchronously, with the content. For example, a print or radio promotion might request prospective audience members to provide audience-generated information from content to be provided subsequently to the actual request. In this way, an evaluation of venue conditions may be made independently of whether or not the request is conveyed through the content itself, or whether the content is even conceived as being used for quality evaluation.

In step 604, at least one condition at a display venue is determined based on the received information. Based on result(s) of the determination, one or more tasks can be undertaken, including, for example, proposing, formulating and/or implementing at least one action for changing or improving the condition at the display venue, as shown in optional step 606.

Figure 7:
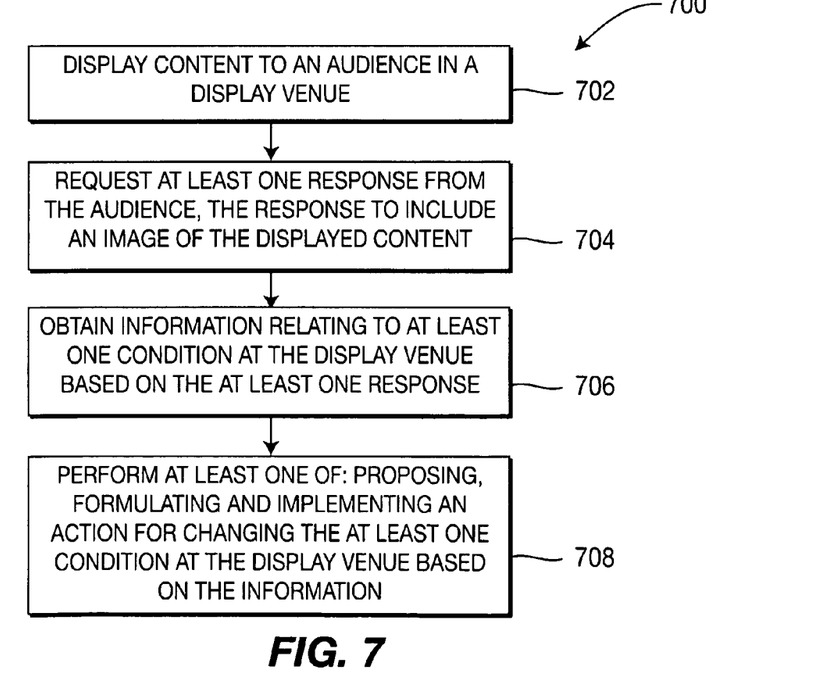
FIG. 7 illustrates another method for use in a display venue according to another embodiment of the present principles.

Another embodiment, method 700, is shown in FIG. 7. In step 702, content is displayed to an audience. In step 704, a request is made for at least one response from the audience, the response to include an image of at least a portion of the displayed content. The request for response may be included visually as a part of the displayed content, or as an audio portion of the provided content. For example, the audience may be requested to perform at least one of the following: capture an image, e.g., a photograph, of at least a portion of the displayed content or test pattern, send the image to an address (e.g., email, website, among others), respond to at least one question in the displayed content, or other actions as may be desirable for assessing the conditions at the venue such as environmental conditions and operating conditions of equipment. In addition, the request or instruction may also specify the mode of communication and/or addresses for submitting the responses and/or images, e.g., via emails, short message services (SMS), multimedia message services (MMS), websites, among others.

In step 706, based on the at least one image or response, information is obtained or determined regarding at least one of: a status of a system or equipment, and a condition of the display environment. Depending on the submitted response, the determination may be performed by a person, a machine with suitable software, or a combination of person, machine and/or software. Based on the information, one or more tasks can be performed, including, for example, at least one of: proposing, formulating and implementing an action for changing or improving the at least one condition at the venue, as appropriate. This is shown in optional step 708.

As illustrated above, different features can be provided in the content or image displayed to the audience. These features can be used or incorporated in a method or system of the present invention in different combinations. Similarly, different actions or method steps can be performed in various combinations and/or sequence, if appropriate.

Depending on the specific arrangements, the various tasks of displaying content, collecting audience responses, evaluating the responses, determining conditions at the display venue, proposing, formulating and/or implementing corrective actions or changes, may be performed by one or more parties. For example, the exhibitor or a party responsible for theatre operations may process the responses from the audience, determine the venue condition(s) based on the responses and take corrective action, if needed. Alternatively, the exhibitor or theatre owner can contract with one or more parties to receive and evaluate the audience's responses, and/or propose one or more actions for changing the conditions based on the evaluation.

In another embodiment, a computer readable medium (e.g., memory, storage device, removable media, and so on) is provided with stored program instructions, which, when executed by a processor, will cause a method to be implemented such as described above according to one or more embodiments of the present principles.

While the forgoing is directed to various embodiments of the present invention, other and further embodiments of the invention may be devised without departing from the basic scope thereof. As such, the appropriate scope of the invention is to be determined according to the claims, which follow.

The invention claimed is:

1. A method, comprising:
   receiving, at a server, information provided through a portable device by at least one member of an audience in response to a request associated with content provided to the at least one member of the audience, the content provided using equipment associated with a display venue; and
   determining at least one condition at the display venue based on the received information, the at least one condition being at least one of: an operating condition of equipment at the display venue and an environmental condition at the display venue;
   wherein the content includes a characteristic associated with assessing the at least one condition, and the information is at least partially based on detection of the characteristic by the portable device.

2. The method of claim 1, further comprising:
   performing at least one of: proposing, formulating and implementing an action for changing the at least one condition at the display venue responsive to the received information.

3. The method of claim 1, wherein the content is displayed to the at least one member of the audience at the display venue.

4. The method of claim 1, wherein the characteristic is associated with assessing the operating condition of a projection system in the display venue.

5. The method of claim 1, wherein the characteristic includes a pattern for display having one or more elements representing at least one of: an alignment mark, a color gradient, and a boundary defining an inner region and an outer region of the image.

6. The method of claim 1, wherein the characteristic includes a first indicator for an affirmative response and a second indicator for a negative response.

7. The method of claim 1, wherein the received information is image information captured by the at least one member of the audience using the portable device.

8. The method of claim 7, wherein the received information includes an answer to a question relating to the at least one condition at the display venue.

9. The method of claim 1, wherein the received information includes an identifier associated with the display venue.

10. The method of claim 9, wherein the identifier is provided as one of: an identifier embedded in the content, and a static identifier separate from the content.

11. The method of claim 10, wherein the identifier is dynamically generated and included in the content provided to the audience.

12. The method of claim 1, further comprising:
    receiving the information from the at least one member of the audience via at least one of an electronic mail and short messaging service.

13. A method, comprising:
    displaying content to at least one member of an audience, the content being displayed using equipment associated with a display venue;
    requesting at least one response from the at least one member of the audience, the at least one response including an image of at least a portion of the displayed content captured by the at least one member of the audience using an image-capturing device; wherein the portion of the displayed content includes a characteristic associated with assessing at least one condition at the display venue; and
    establishing information relating to the at least one condition based on the at least one response received by a server from the at least one member of the audience.

14. A system, comprising:
    a processor configured for displaying content to at least one member of an audience in a display venue and for requesting at least one response from the at least one member of the audience, the at least one response including an image of at least a portion of the displayed content captured by the at least one member of the audience using an image-capturing device; wherein the portion of the displayed content includes a characteristic associated with assessing at least one condition at the display venue; and a server configured for receiving the at least one response.

15. The system of claim 14, wherein the server is further configured for determining the at least one condition based on the at least one response.

16. The system of claim 14, wherein the displayed content includes one or more elements representing at least one of: a first indicator for an affirmative response, a second indicator for a negative response, an alignment mark, a color gradient, and a boundary defining an inner region and an outer region of the image.

17. The system of claim 14, wherein the processor is configured for providing a request for the at least one member of the audience to capture an image of at least a portion of the displayed content.

18. The system of claim 14, wherein the at least one response further includes an identifier associated with the display venue.

19. The system of claim 18, wherein the processor is further configured for dynamically generating the identifier for inclusion in the displayed content.

20. The system of claim 14, wherein the server is further configured for receiving the at least one response via at least one of an electronic mail and short messaging service.

\* \* \* \* \*